United States Patent [19]
Dai

[11] Patent Number: 6,123,312
[45] Date of Patent: Sep. 26, 2000

[54] PROACTIVE SHOCK ABSORPTION AND VIBRATION ISOLATION

[76] Inventor: Yuzhong Dai, 26 Osprey Dr., Coventry, R.I. 02816

[21] Appl. No.: 09/192,487

[22] Filed: Nov. 16, 1998

[51] Int. Cl.[7] ................................................ F16M 13/00
[52] U.S. Cl. ...................... 248/550; 188/378; 248/638; 267/136
[58] Field of Search .................................. 248/550, 638, 248/637, 562, 566, 581; 267/136; 188/378, 329, 380

[56] References Cited

U.S. PATENT DOCUMENTS

| | | | |
|---|---|---|---|
| 5,802,966 | 9/1998 | Schoch | 248/550 X |
| 5,848,663 | 12/1998 | Kuriki | 248/550 X |
| 5,876,012 | 3/1999 | Haga et al. | 248/550 |
| 5,881,987 | 3/1999 | Hara | 248/550 |
| 5,884,736 | 3/1999 | Burdisso et al. | 248/550 |

*Primary Examiner*—Ramon O. Ramirez

[57] ABSTRACT

Disclosed are methods and apparatuses for varying stiffness and/or damping characteristics of a vibration isolation system based on the machine's control signal which indicates the motion status of at least one movable component of a machine supported by the vibration isolation system. The motion status of the movable component can be monitored via parameters such as the electrical power being injected into the motor of the movable component. More stiffness and/or damping are provided to absorb shocks generated while the movable component accelerates or decelerates and less stiffness and/or damping are provided while the movable component moves at a nominally constant speed or stands still. The stiffness and/or damping characteristics of a vibration isolation system are varied by controlling one or more of the following: 1) the gas flow rate between two gas chambers, 2) the strength of a magnetic field applied to a magnetorheological fluid or ferrofluid, and 3) the strength of an electric field applied to an electrorheological fluid.

19 Claims, 6 Drawing Sheets

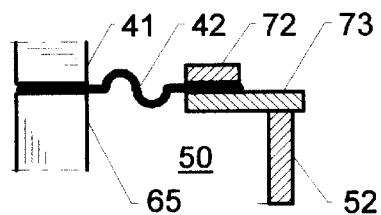
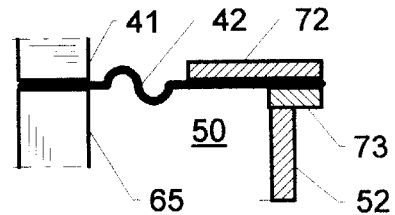
FIG. 8(a)　　　　FIG. 8(b)
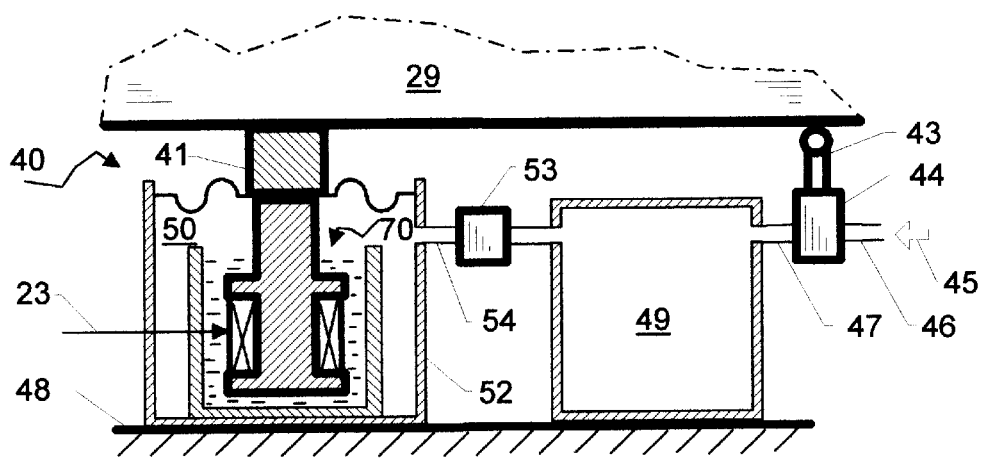
FIG. 9
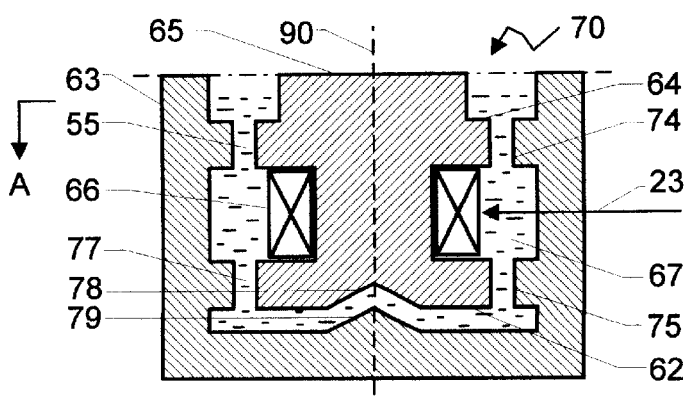
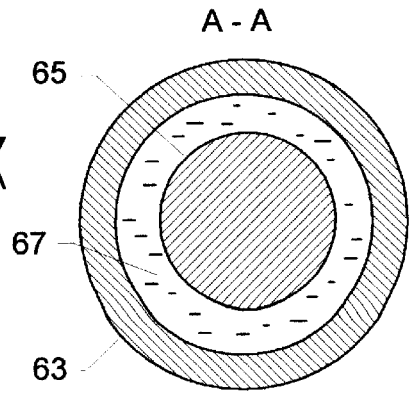
FIG. 10(a)　　　　FIG. 10(b)

PROACTIVE SHOCK ABSORPTION AND VIBRATION ISOLATION

FIELD OF THE INVENTION

The subject invention relates to controllable shock absorption and vibration isolation for precision machines having one or more movable components.

BACKGROUND OF THE INVENTION

The performance, such as accuracy and repeatability, of a precision machine operating in a vibration environment can be improved if the vibration isolation system supporting the machine provides controllable stiffness and/or damping characteristics during the machine's various phases of operation.

As schematically shown in FIG. 1, a machine 5 has a machine base 29 which is supported, via a cradle 58, by a plural number of isolator assemblies 40 which rest on a support 48. A movable component 27 of the machine is driven by a motor 25 through a transmission mechanism 26 to move along direction 28. Motor 25 is controlled by a control signal 21 which is generated by a motion controller 20 upon receiving either a digital motion signal 15 from a digital computer 10 or an analog motion signal 14 from a manual controller 12. The motion of movable component 27 during a typical machine operation cycle serves two purposes: a) positioning movable component 27, and b) accomplishing an intended task. The velocity profile of movable component 27 during a typical operation cycle is depicted in FIG. 2(a) where the above mentioned first purpose is accomplished during phases A, B, and C, and the second during phase D. The speed of movable component 27 first increases at a uniform rate to V_2 during phase A and then stays constant during phase B as shown in FIG. 2(a). When movable component 27 is at a pre-determined distance from its destination, it's speed is reduced to V_1 during phase C. Movable component 27 then moves at a constant speed V_1, which can be zero for certain applications, during phase D till the intended task is accomplished.

High throughput demand for machine 5 requires that movable component 27 spend the least possible time during phases A, B, and C. This results in a large magnitudes for acceleration A_1 and, deceleration A_2 in phases A and C, respectively (FIG. 2(b)). A greater magnitude of acceleration and deceleration of movable component 27 in turn results in greater magnitude of forces, F_1 and F_2 in phase A and B, respectively. These forces are exerted on isolator assemblies 40 (FIG. 2(c)), causing machine base 29 to deviate from and oscillate about its equilibriums position, and causing a degraded machine performance during phase D. To minimize this deviation, it is preferable that isolator assembly 40 has a maximum stiffness characteristic during phases A, B, and C. It is also desirable for isolator assembly 40 to exhibit a maximum damping characteristic to facilitate settling of the oscillation before movable component 27 starts the intended task during phase D.

The high precision requirement for the machine's intended task at the end of phase D, however, requires maximum efficiency of vibration isolation of the machine by vibration of support 48. This requires that isolator assembly 40 exhibit minimum stiffness and damping characteristics, the former reduce the natural frequency of the system and the latter improve the isolation efficiency of the machine by vibration of support 48 at higher frequencies.

Clearly the high throughput and high precision demands for the machine impose conflicting requirements on the stiffness and damping characteristics of the vibration isolation system. However, as shall be discussed in detail below, no existing art can satisfy these requirements.

Most of the vibration isolation systems available today have fixed stiffness and damping characteristics. They are referred to as "semi-active" because they can automatically re-level a machine supported by them in response to a slow change in level of the machine due to a change in the force exerted on them. FIG. 1(b) shows schematically a cross-sectional view (along line 1b—1b in FIG. 1(a)) of such a system in which isolator assembly 40 is disposed, via cradle 58, between machine 5 and support 48. An adapter 41 connects cradle 58 and a flexible diaphragm 42 supported by pressurized gas in chamber 50. Chambers 50 and 49, both are charged by pressurized gas 45 via a gas passage 46, are separated by separator 51 and communicate with each other via a communication passage 54. Chamber 49 serves both as a reservoir and, together with communication passage 54, as a damper in isolator assembly 40. A pressure regulator 44 regulates the gas pressure in chambers 49 and 50, via a gas passage 47 and a communication passage 54, according to feedback from a lever 43 which responds to the deviation of cradle 58 from its equilibrium position caused by a change in force exerted on isolator assembly 40. The stiffness of isolator assembly 40 is determined by the size of chambers 50 and 49, while the damping is primarily determined by the gas flow rate through communication passage 54. Because of the low dynamic response of lever 43, pressure regulator 44, and gas in chambers 50 and 49, this mechanism only operates are required for slow changes in the exerted force, such as a change in force caused by a change in the center of gravity of the machine which results in a slow but significant change in the position of movable component 27. This type of vibration isolation system is inadequate for ensuring adequate performance of a precision machine because of its fixed stiffness and damping characteristics and its slow dynamic response. Additionally, components such as cradle 58 and its connectors introduce problems such as instability, inadequate connection between machine base 29 and isolator assembly 40, and design complexity.

A second type of vibration isolation system is referred to as "active" because it uses transducers, such as accelerometers, to constantly sense certain parameters of machine motion, such as velocity or acceleration, which are the result of external disturbances. The senses values of these parameters are used to control the generation of either a force or a displacement in response to the external disturbances for the purpose of maintaining the machine at its equilibrium position. This type of isolation system not only requires the use of sensors but also proved to be inadequate for ensuring adequate performance of a precision machine because of its limited capability for controlling its displacement, and stiffness. These capability limitations result in poor vibration isolation efficiency at high frequencies.

U.S. Pat. No. 4,757,980 issued to Dale W. Schubert discusses a parametrically controlled active vibration isolation system whose damping is controlled by using a servo valve which is actuated in response to velocities, measured by two velocity sensors. The sensors measure velocities of a machine and a support connected by the vibration isolation system. The system is intended for isolating the machine from vibration of the support. Similarly to all other prior art active isolation systems, it requires the use of sensors. Additionally, it is inadequate for application to a precision machine because it relies on velocity signals. As shall be discussed later, mechanical shocks and change in forces acting on isolator assemblies are primarily caused by acceleration, not velocity, of the movable component of a machine.

U.S. Pat. No. 5,379,980 issued to Worthington B. Houghton et al. discusses systems for intermittent stabilization of a machine by determining a load shift condition, increasing passage of gas to pneumatic isolators supporting the machine, and imposing external or internal damping to the machine in response to the load shift condition. These systems rely on sensors to determine or a computer to anticipate a load shift condition such as the position change of the payload or its loading or unloading to and from the machine. The drawbacks of these systems, in addition to having to use sensors or signals from a computer, include slow response and overshooting due to the slow dynamic response of gas, which fills the chambers of the pneumatic isolators, to the load shift condition. A somewhat similar system is disclosed in U.S. Pat. No. 4,941,265 issued to Klaus-Peter Heiland, wherein the position of a movable element of a machine, which is either monitored by sensors or derived from a digital computer, is compared with a memory for actuating a plunger to change the gas pressure in an isolator to maintain the position of the machine. It also includes logic means to ensure that the plunger is already actuated before anticipated motion of the movable element takes place. This system, in addition to the need for a complex circuitry to generate a driving signal for the plunger and to detect the position of the plunger, reduces the machine's throughput because of the slow dynamic response of gas being pressurized or released by the plunger. Therefore this kind of system can not be applied to counter a change in machine position due to dynamic forces such as those caused by the acceleration or deceleration of the movable element of the machine. In addition, the occurring of the plunger motion before the anticipated motion of the movable element tilts the machine in the opposite direction to that caused by the anticipated motion of the movable element, negating the purpose of maintaining the position of the machine. Besides, the position signal from the computer of a machine is not always executed immediately by the motion controller. Therefore the position signal, or any signal from the computer, is generally not a reliable indication of the motion status of the movable component of the machine.

There also exists prior are relating to the design of vibration dampers with controllable damping characteristic. Two kinds of dampers with certain relevance to the present invention are described in U.S. Pat. No. 5,277,281 issued to J. David Carlson et al., U.S. Pat. No. 5,573,088 issued to John J. Daniels. The U.S. Pat. No. 5,277,281 patent disclosed a controllable damper whose damping characteristic is varied by changing the strength of a magnetic field applied to a magnetorheological fluid, while the U.S. Pat. No. 5,573,088 patent accomplishes the same purpose by varying the strength of an electric field applied to an electrorheological fluid. Because of the limited load carrying capabilities and inadequacy in the amount of allowable deflection along multiple directions, improvements are needed before the above mentioned controllable dampers can be applied to precision machines operating in a vibration environment.

BRIEF SUMMARY OF THE INVENTION

An object of the present invention is to provide a simple, fast, and effective method for generating an activation signal for varying the stiffness and/or damping characteristics of a vibration isolation system supporting a machine.

A further object of the present invention is to provide a pro-active vibration isolation system, which combines the first object of the invention with fast acting, effective isolators for varying the stiffness and/or damping characteristics of the vibration isolation system.

Another object of the present invention is to provide a stable, easy to install, single-chamber isolator assembly with controllable stiffness and/or damping characteristics, and a low natural frequency.

Other objects of the invention will become apparent in the further course of this disclosure.

In accordance with the invention, the above first and second objects are accomplished by a method comprising the steps of deriving a control signal from a machine supported by a vibration isolation system, processing said control signal to yield an activation signal, and varying the stiffness and/or damping characteristics of said vibration isolation system in response to said activation signal during each phase of operation of the machine. The vibration isolation system exhibits a maximum stiffness and/or damping characteristics when the control signal exceeds a predetermined threshold and a minimum stiffness and/or damping characteristics otherwise. The stiffness and/or damping characteristics can be controlled by varying one or more of the following: 1) the gas flow rate in a gas passage, 2) the strength of a magnetic filed applied to a magnetorheological fluid or a ferrofluid, and 3) the strength of an electric field applied to an electrorheological fluid.

The third object of the invention is accomplished by combining the two chambers connected by a gas passage in a typical vibration isolation system into a single chamber with a built-in controllable stiffness and/or damping mechanism and a self-leveling mechanism. From a related aspect thereof this invention also provides a method for generating an activation signal for controlling the stiffness and/or damping characteristics of a vibration isolation system supporting a machine which has a plural number of movable components.

BRIEF DESCRIPTION OF THE DRAWINGS

FIGS. 8(a, b) are partial views of embodiments for varying the load supporting capability of an isolator assembly by limiting the effective are of the flexible diaphragm of the isolator assembly;

FIG. 9 shows a cross-sectional view of the combination of a controllable isolator assembly with a traditional pneumatic isolator assembly;

FIGS. 10(*a, b*) show two orthogonal cross sections of the structure of a controllable isolator utilizing a magnetorheological fluid;

DESCRIPTION OF PREFERRED EMBODIMENTS

Figure 3:
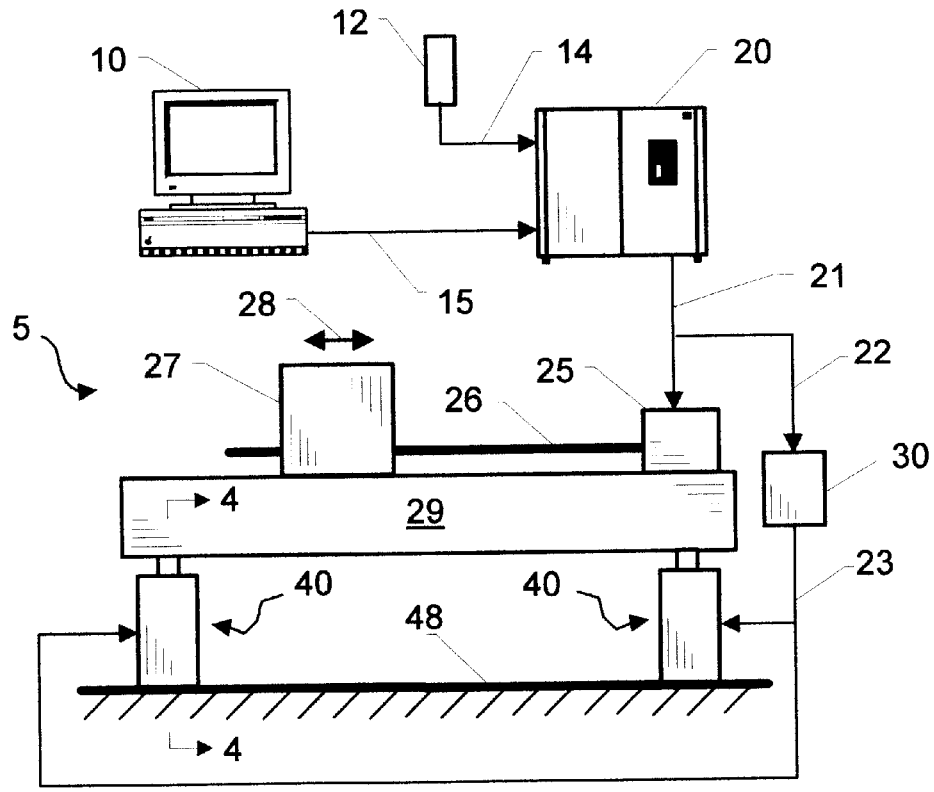
FIG. 3 depicts an embodiment for deriving a control signal from a machine for generating an activation signal to vary the stiffness and/or damping characteristics of a vibration isolation system supporting the machine.
Figure 4:
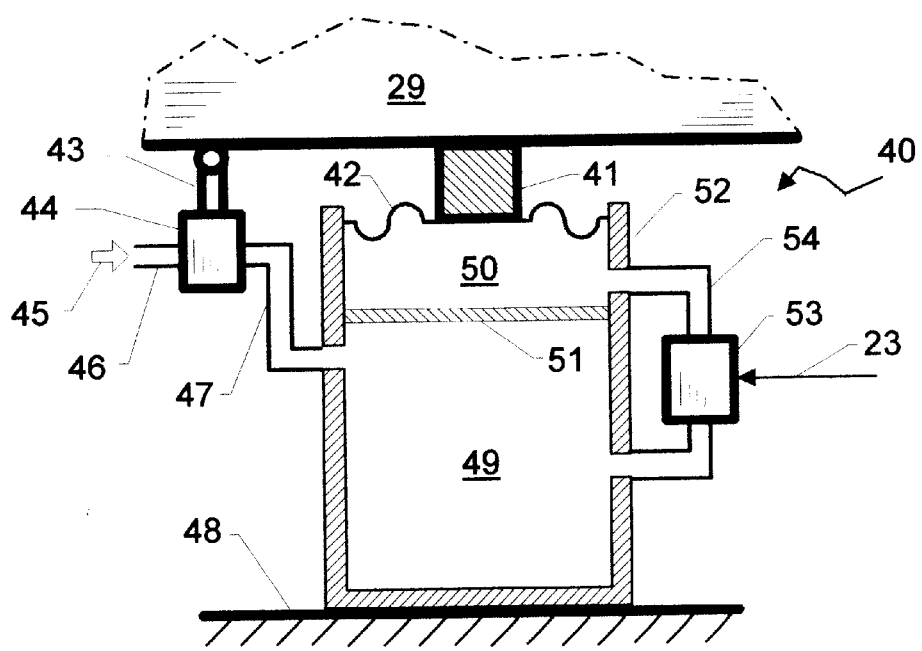
FIG. 4 is a schematic cross-sectional view along line 4—4 of FIG. 3.

FIG. 3 schematically shows a preferred embodiment wherein a machine base 29 of a machine 5 is supported by a plurality of isolator assemblies 40 resting on a support 48. A cross-sectional view (along line 4—4 in FIG. 3) of isolator assembly 40 is schematically shown in FIG. 4. Pressurized gas 45 is injected into a pressure regulator 44, which is fixed with respect to a body 52 of chamber 49 via a gas passage 46. Pressure regulator 44 regulates the gas pressure in chamber 49 and, via a gas passage 47 and a communication passage 54, in chamber 50 based on the feedback from lever 43 in response to a deviation of machine base 29 from its equilibrium position. Such deviation can be the result of a load change condition such as a slow change in the center of gravity of the machine due to a slow but significant change in the position of movable component 27 with respect to machine base 29. The machine is supported by chambers 50 and 49 via an adapter 41 and a flexible diaphragm 42, which is supported by the pressurized gas in chamber 50. The vertical and the horizontal stiffness of isolator assembly 40 is determined by, among other factors, the size of chambers 50 and 49 and the design of flexible diaphragm 42. The damping characteristic of isolator assembly 40 is determined by the gas flow rate through communication passage 54, which is controlled by an isolation controller 53.

The machine's movable component 27 is driven by a motor 25 through a transmission mechanism 26 to move along direction 28. Motor 25 is controlled by a control signal 21 which is generated by a motion controller 20 upon receiving either a digital motion 15 from a digital computer 10 or an analog motion signal 14 from a manual controller 12. Motion controller 20 can be a standalone unit as shown in FIG. 3 or an electronics board embedded in computer 10.

As discussed earlier, a vibration isolation system supporting a precision machine must provide more stiffness and/or damping during phases A, B, and C, and less stiffness and/or damping during phase D, respectively, of the machine's typical operation cycle, which has a velocity profile as shown in FIG. 2(*a*). The variation of stiffness and/or damping can be accomplished easily using known art such as an actuator. Therefore the method for generating an activation signal to control the stiffness and/or damping characteristics determines the effectiveness of a vibration isolation system. The present invention describes a method which generates this activation signal by making use of control signal 21 instead of sensors or a digital computer as used in prior art.

In the embodiment shown in FIGS. 3 and 4, control signal 21 generated by the machine's motion controller 20 is derived, via electrical wires 22, by an isolation determiner 30 which is responsible for processing the derived control signal 21 to generate activation signal 23. The derived control signal can be the same as the original control signal 21 or its modification. One example of such a modification is a reduction of the voltage of control signal 21. Responding to activation signal 23, isolation controller 53 drives a servo valve to change the cross-section of the communication passage between chambers 50 and 49. Such a change varies the gas flow rate within the communication passage and hence varies the damping characteristic of isolator assembly 40. The servo valve itself and the way to alter the gas passage are not detailed in FIG. 4 because they are well known. One example can be found in U.S. Pat. No. 4,757, 980 issued to Dale W. Schubert.

Corresponding to FIG. 2(*a*) which shows the velocity profile of movable component 27, FIGS. 2(*b, c*) show the acceleration of movable component 27 and the electrical power injected into motor 25, during a typical operation cycle of the machine. (Note that for simplicity purpose, the velocity, the acceleration, and the electrical power shown in FIGS. 2(*a, b, c*) are all assumed to be linear functions during each phase of the operation cycle. They can take other forms as well.) Clearly, the acceleration an be used as indications of the phase of an operation cycle and therefore can be compared with certain thresholds, such as A_1, A_2, for generating activation signal 23. However, the electrical power injected into motor 25 shown in FIG. 2(*c*) proves to be a superior signal source because it can be easily extracted from control signal 21. In practice, certain characteristic of the electrical power is used as a signal source for generating activating signal 23. For example, for a control signal with Pulse Width Modulation (PWM) used in most DC motors the pulse width of the control signal can be used as a signal source. A PWM signal typically is composed of electrical pulses with a fixed excitation voltage and a fixed modulation frequency but a varying pulse width. A more detailed description on PWM can be found in U.S. Pat. No. 5,869, 946 titled "PWM control of motor driver" issued to Francesco Carobolante. Given the modulation frequency, excitation voltage, and other relevant parameters, the pulse width of a PWM type control signal (FIG. 2(*d*)) is directly related to the electrical power injected into a corresponding DC motor. A greater pulse width corresponds to more electrical power. Because this electrical power, excluding the portion necessary for overcoming system friction, back EMF, etc., relates to the magnitude of acceleration or deceleration of movable component 27, the pulse width can therefore be compared with a criterion for generating an activation signal.

In fact control signal 21 itself can be used directly as activation signal 23 without any manipulation, such as power amplification, etc., by isolation determiner 30. To implement this approach, control signal 21 can be directly connected to the actuator (not shown) of isolation controller 53. This actuator responds to control signal 21 by changing the communication passage connecting chambers 50 and 49, thus varying the damping characteristic of isolator assembly 40. This approach, however, can be improved further as discussed in the following.

Figure 2A:
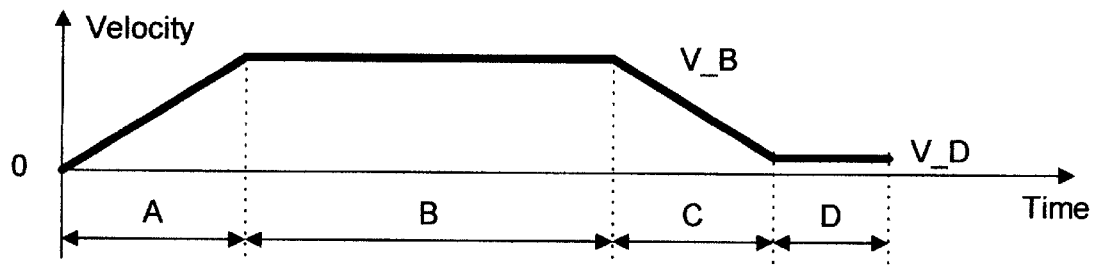
FIGS. 2(a, b, c, d, e) illustrate the velocity, acceleration, electrical power, pulse width of a PWM type control signal, and activation signal during different phases of a typical operation cycle of a machine.
Figure 2B:
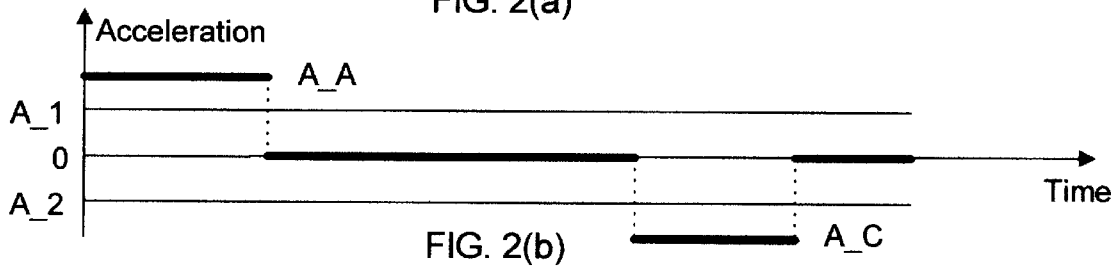
Figure 2C:
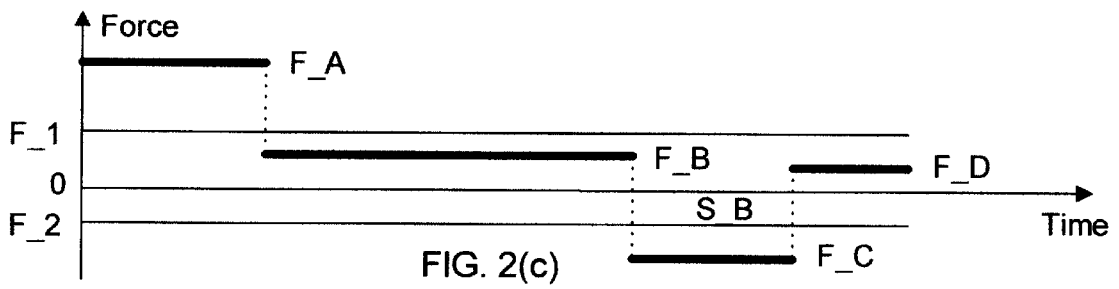
Figure 2D:
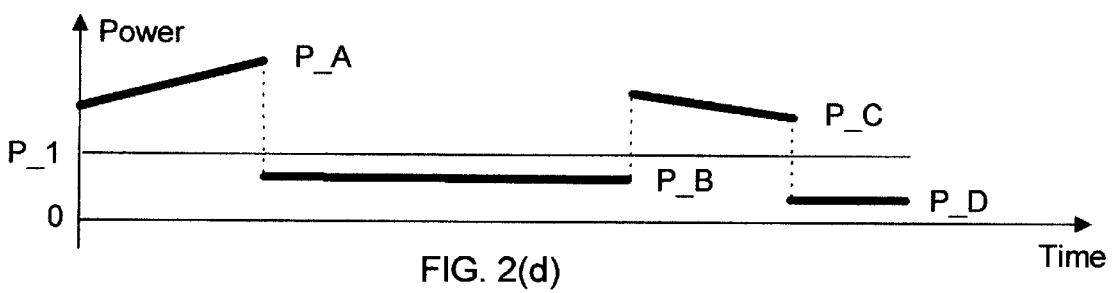
Figure 2E:
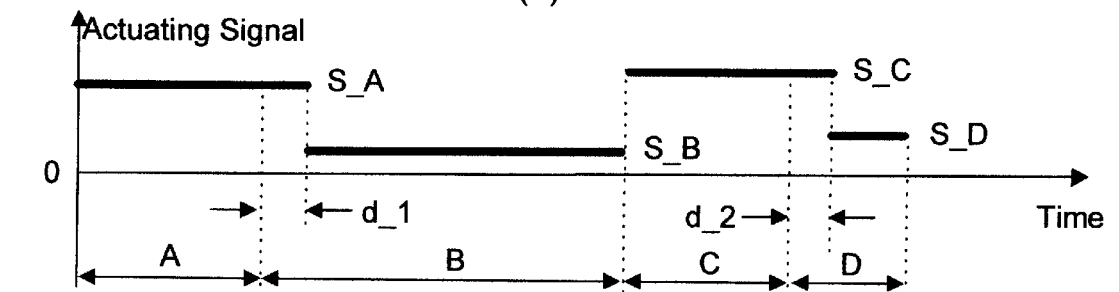

Because of the relatively slow dynamic response of a machine's drive system, the motion of its movable component typically lags behind its control signal. Although motion of the actuator for varying the stiffness and/or damping characteristics of an isolator assembly also lags the activation signal, actuator's lag is much shorter than that of the drive system. This difference in lag makes the variation of the stiffness and/damping happen before the transition of acceleration and electrical power from low-to-high (starting of phase A, and from phase B to C as shown in FIGS. 2(*a, b, c, d*) of the movable component. This is desirable because the stiffness and/or damping of the isolator assembly is already increased before the movable component of the machine accelerates or decelerates, and thus reduces the machine's deviation from and oscillation about its equilibrium position. However, during the high-to-low transition of acceleration and electrical power (phase A to B, phase C to D as shown in FIGS. 2(a, b, c, d)), the faster response of the actuator becomes a disadvantage because its reduces the stiffness and/or damping prematurely, and fails in limiting the machine's deviation from and oscillation about its equilibrium position. Therefore, it is desirable for the actuator to slightly lag behind the movable component of the machine during the high-to-low transition of acceleration and electrical power. An implementation of this approach is shown in FIG. 2(e), wherein activation signal 23 is delayed by a time period of d_1 and d_2 during the transitions from phase A to B and from C to D, respectively. The exact time duration of these delays can be determined by the time needed for the machine to settle sufficiently after the end of each corresponding high-to-low transition. The leading and trailing of the actuator motion during the low-to-high transition and high-to-low transition, respectively, as discussed above do not cause the machine to deviate from its equilibrium position because the actuator only changes the gas flow rate instead of changing the gas pressure in the isolator assembly. Activation signal 23 can be determined, on the other hand, by comparing the pulse width of control signal 21 with the threshold W_1 as shown in FIG. 2(d). Other characteristic of control signal 21, such as electrical current, can also be used for generating activation signal 23.

Note that the activation signal in phase B corresponds to a minimum damping in the example as shown in FIG. 2(e) to allow lever 43 and pressure regulator 44 to level machine base 29 in response to the center of gravity change caused by the position change of movable component 27 during phases A and B of an operation cycle.

Figure 1A:
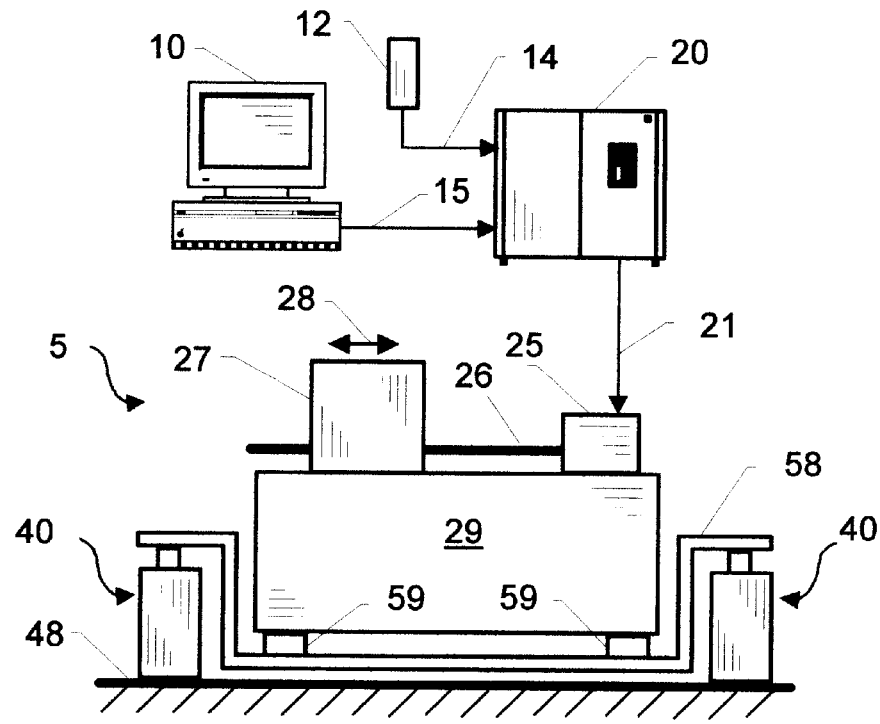
FIGS. 1(a, b) are schematic representations of a prior art depicting a vibration isolation system supporting a machine.
Figure 1B:
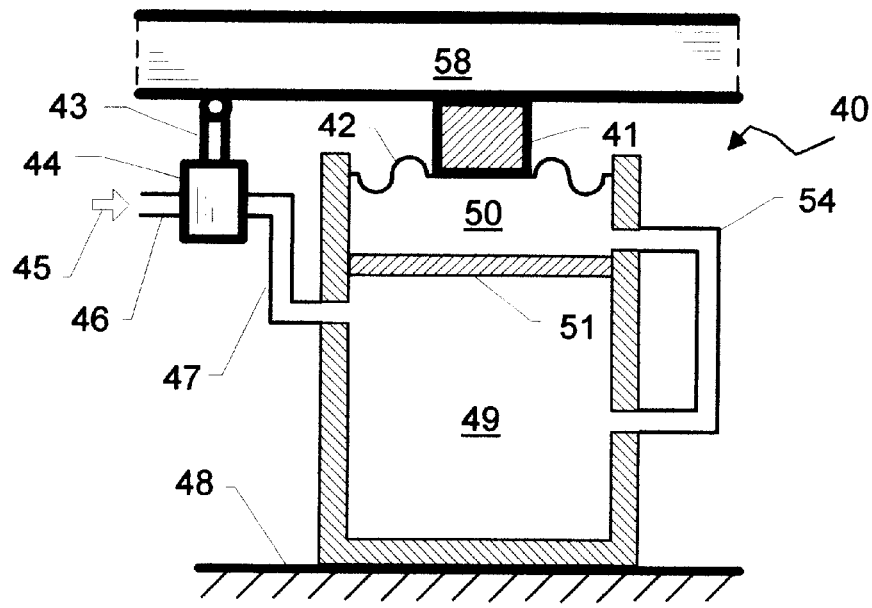
Figure 5:
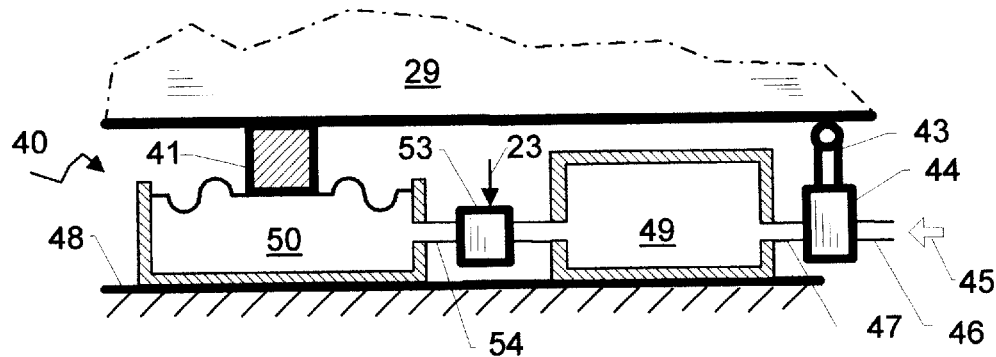
FIG. 5 is a schematic representation of a two-chamber isolator assembly arranged horizontally to improve stability.

Unlike the prior art as shown in FIG. 1, no cradle is used in the above embodiment as shown in FIGS. 3 and 4. The omission of the cradle not only simplifies the structure of the vibration isolation system so that it becomes more stable but also makes the system easier to assemble. To make it even more stable, gas chambers 50 and 49 shown in FIG. 1(b) and FIG. 4 can be rearranged so that they are placed horizontally. A cross-sectional view (e.g. along line 4—4 in FIG. 3) of such an isolator assembly is shown in FIG. 5. The horizontal arrangement not only significantly lowers the center of gravity of isolator assembly 40 and machine 5, but also makes the installation of isolator assembly 40 much easier.

One or more additional controllable or fixed dampers, such as the fluid damper as disclosed in U.S. Pat. No. 5,464,196 issued to John C. Dankowski, can be added to chamber 50 of the above embodiments to modify the damping characteristic of isolator assembly 40.

Figure 6:
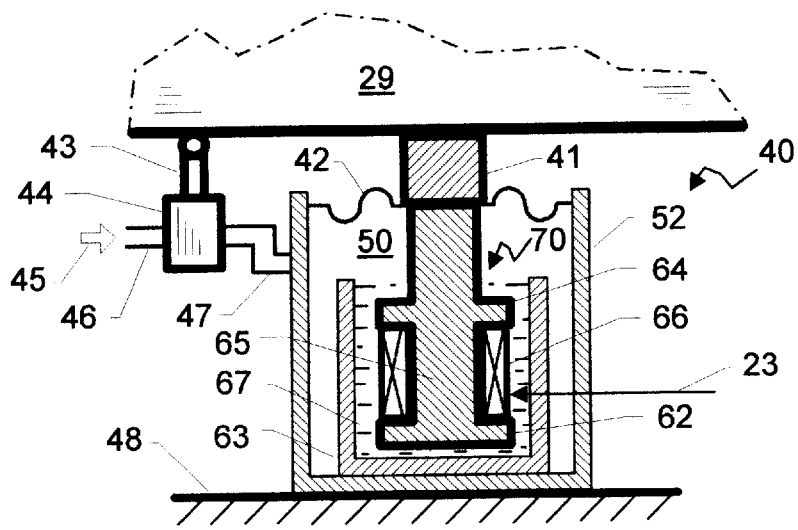
FIG. 6 is a schematic representation of a single-chamber isolator assembly with controllable stiffness and damping characteristics utilizing a magnetorheological fluid.

Another embodiment of the invention, with a cross-sectional view (e.g. along line 4—4 of FIG. 3) as shown in FIG. 6, makes use of a magnetorheological fluid which exhibits a change in flow characteristics, such as viscosity, in response to a change in the strength of a magnetic field applied to the fluid. Magnetorheological fluids consist of micron sized particles, which can be magnetically polarized, dispersed in a carrier medium. The formation of particle chains upon the application of a magnetic field increased the yield strength of the magnetorheological fluid, increasing the stiffness and damping of the isolator assembly equipped with such a fluid. Such an increase in stiffness and damping is related to the relative displacement between two objects separated by the magnetorheological fluid. It is, however, independent of the relative velocity between the two objects. This independence of relative velocity improves the controllability of the isolator assembly and therefore is more desirable than the traditional viscous damping, which is proportional to the relative velocity.

Because a magnetorheological fluid can also serve as a damping fluid in absence of a strong magnetic field, the use of gas chamber 49 as part of a damper as shown in FIGS. 3, 4 and 5 becomes optional. FIG. 6 shows an embodiment featuring a single gas chamber and a controllable isolator 70 which consists of a magnetorheological fluid 67, an controllable isolator body 63, and an electromagnet assembly consisting a piston 65 and a coil 66 for generating a magnetic filed.

A shown in FIG. 6, pressurized gas 45 is injected, via a gas passage 46, into a pressure regulator 44 which is fixed with respect to a body 52 of a chamber 50. Pressure regulator 44 regulates the gas pressure in chamber 50, via a gas passage 47, in response to feedback from a lever 43 which is responsive to deviation of machine base 29 from its equilibrium position. Chamber 50 supports machine base 29 via an adapter 41 and a flexible diaphragm 42. Controllable isolator 70 consists of coil 66, piston 65, and controllable isolator body 63 filled with magnetorheological fluid 67. Coil 66 is wound upon spool shaped piston 65 between an upper flange 64 and a lower flange 62. Flanges 62, 64 and piston 65 are made of a magnetically permeable material, such as low carbon steel. Coil 66 is electrically connected to an activation signal 23 using known methods such as that taught in U.S. Pat. No. 5,277,281 issued to J. David Carlson et al. In the rest position the outer surfaces of piston 65 are kept at suitable distances from the inner surfaces of controllable isolator body 63 to allow relative motion between then in both horizontal and vertical directions. Controllable isolator body 63 is also made of magnetically permeable material in order to form the return path of the magnetic filed generated by piston 65 and coil 66. Controllable isolator body 63 is rigidly fixed to body 52 of chamber 50. Flexible diaphragm 42 is claimed between piston 65 and an adapter 41, which is connected to machine base 29. When a plural number of such controllable isolators is deployed to support a machine having a rigid base, the connection between adapter 41 and machine base is preferably rigid in order to prevent piston 65 from significantly tilting with respect to controllable isolator body 63. Such tilting, if significant, can change the gap between piston 65 and controllable isolator body 63 and hence can reduce the efficiency of controllable isolator 70.

Upon receiving activation signal 23, which can be generated by the same methods described in the above embodiments and can take either a continuous or a stepped form such as that shown in FIG. 2(e), coil 66 and piston 65 generate a magnetic field whose strength is proportional to the electrical current flowing through coil 66. The yield strength of magnetorheological fluid 67 disposed in this magnetic field increases, creating a greater resistance opposing the displacement of piston 65 with respect to controllable isolator body 63 in both the horizontal and the vertical directions. As a result, the stiffness and damping of isolator assembly 40 become greater.

Chamber 50, flexible diaphragm 42, and controllable isolator 70 as shown in FIG. 6 all contribute to the total effective stiffness of isolator assembly 40. The vertical stiffness of isolator assembly 40 is primarily determined by the size of chamber 50 and the level of magnetization of magnetorheological fluid 67. The horizontal stiffness of isolator assembly 40 is primarily determined by flexible diaphragm 42 and the level of magnetization of magnetorheological fluid 67. Both the vertical and the horizontal damping characteristics of isolator assembly 40 are determined by the level of magnetization of magnetorheological fluid 67. For clarity purpose, two cases with isolator assembly 40 having different stiffness and damping characteristics are discussed in the following:

If minimum stiffness and damping from isolator assembly 40 is required, activation signal 23 takes low levels S_B and S_D for phases B and D, respectively, of the operation cycle as shown in FIG. 2(e). Once the required stiffness and damping are know, the exact level of activation signal can be determined based on the viscosity and yield strength of magnetorheological fluid 67 and other factors such as the geometry and dimension of controllable isolator body 63 and piston 65. Activation signal S_B and S_D during these two phases of an operation cycle can be set at a very low level to reduce the stiffness of controllable isolator 70 so that the stiffness of chamber 50 becomes dominant, providing maximum isolation efficiency to the machine. In fact, because most of the materials used in electromagnets exhibits magnetic hysteresis, activation signals S_B and S_D can be set at a level lower than zero to demagnetize the electromagnet of controllable isolator 70 in order to minimize the stiffness and/or the damping characteristics of controllable isolator 70.

If maximum stiffness and damping from isolator assembly 40 is required, activation signal 23 takes high levels S_S and S_C for phase A and C, respectively, of the operation cycle as shown in FIG. 2(e). Activation signals S_A and S_C during these two phases of the operation cycle can make the yield strength of magnetorheological fluid 67 so high that the stiffness of controllable isolator 70 becomes dominant, providing maximum shock absorption and reducing the machine's deviation from and oscillation about its equilibrium position.

Controllable isolator 70 shown in FIG. 6 can be easily installed into chamber 50 of previous embodiments (FIGS. 4 and 5) and can be controlled by activation signal 23 in the same way as in the above embodiment (FIG. 6). In such an arrangement isolation controller 53 becomes optional, although it is preferable that isolation controller 53 be present to provide a constant damping characteristic.

Figure 7:
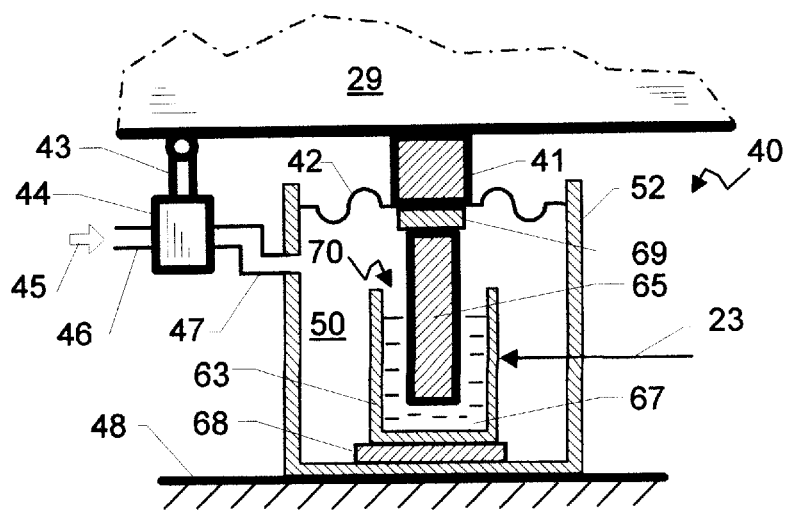
FIG. 7 is a schematic representation of a single-chamber isolator assembly with controllable stiffness and damping characteristics utilizing an electrorheological fluid.

FIG. 7 depicts a cross-sectional view (e.g. along line 4—4 in FIG. 3) of yet another embodiment which is essentially the same as the embodiment as shown in FIG. 6 except for the use of an electrorheological fluid in place of the magnetorheological fluid, and the use of insulators and different methods for connecting activation signal 23. In this embodiment, activation signal 23 is in the form of a high electrical voltage applied to controllable isolator body 63 and piston 65, both of which serve as electrodes for forming an electric field. Controllable isolator body 63 is electrically insulated from body 52 of chamber 50 by an insulator 68. Piston 65 is also insulated from body 52 of chamber 50 and machine base 29 by an insulator 69. When the electrodes are not electrically charged, electrorheological fluid 67 is electrically neutral making the charges within the fluid free to move in the fluid. When an electrical voltage is applied, a positive charge is acquired by one electrode while a negative charge is acquired by the other electrode, forming an electric field acting on electrorheological fluid 67 between the electrodes. Charges in the particles dispersed in electrorheological fluid 67 react by shifting the negative charge to the particle side nearest the positive electrode and the positive charge to the particle side nearest the negative electrode. After the charges re-orient, the particles react to the local electric field by lining up with their positive and negative ends to form a chain like structure. This chain like structure resists the shear motion between the two electrodes and increases the stiffness and damping characteristics of controllable isolator 70 shown in FIG. 7.

Another fluid, ferrofluid, which exhibits a behavior similar to that of the magnetorheological fluid when subject to a magnetic field, can also be used in place of magnetorheological fluid 67 in an arrangement schematically shown in FIG. 6. The details in using the ferrofluid for damping applications can be found in an article entitled "Commercial Applications of Ferrofluids", which was published in "Journal of Magnetism and Magnetic Materials", Volume 85(1990), pages 233–245.

With some relevant modifications, other techniques for generating a controllable stiffness and/or damping characteristics, such as eddy-current, can also be used for constructing a controllable isolator. An example of using eddy-current for damping applications can be found in U.S. Pat. No. 4,883,250, issued to Kenichi Yano, et al.

The load carrying capability of isolator assembly 40 discussed above is primarily determined by multiplying the gas pressure by the area of flexible diaphragm 42 exposed to the pressurized air. In order to use as few isolator assembly designs as possible for supporting machines with different weights, it is preferable that the gas pressure in isolator assembly 40 be changed according to the weight of the machine supported thereon. However, because of the limited range of gas pressure variation in practice, isolator assemblies of many different sizes have been made to suit machines with a wide range of weight. The range of sizes results in problems in design, manufacturing, inventory control, and maintenance. Two embodiments, which are modifications of the isolator assemblies such as those depicted in FIGS. 4 through 7, are disclosed herein to solve this problem. FIG. 8(a) shows a partial view (e.g. ellipse P in FIG. 6) of one embodiment of an isolator assembly wherein the load carrying capacity of an isolator assembly is varied by controlling the area of flexible diaphragm 42 exposed to pressurized gas while the size of the isolator assembly is kept the same for different machine weights. In this embodiment, an upper flange 72 clamps flexible diaphragm 42 onto a lower flange 73, which is rigidly connected to the body of isolator assembly 40. Flanges 72 and 73 can be designed to reduce the area of flexible diaphragm 42 exposed to the pressurized gas in chamber 50 in order to accommodate machines with less weight. A variation of the embodiment shown in FIG. 8(a) is schematically shown in FIG. 8(b), wherein the lower flange 73, which can be made s an integral part of the body of isolator assembly 40, has a fixed size while the size of the upper flange 72 is varied to accommodate machines with different weights.

It should be noted that one or more additional springs and/or dampers, either with variable or fixed characteristics, can be added to the isolator assemblies discussed in any of the above described embodiments to modify the load carrying capability and the stiffness and/or damping characteristics of the vibration isolation systems. FIG. 9 schematically shows an embodiment, which combines the embodiment shown in FIG. 5 and the embodiment shown in FIG. 6. Other than the damping provided by controllable isolator 70, isolation controller 53, communication passage 54, and reservoir 49 provide additional damping, either fixed as shown in FIG. 9 or controllable by activation signal 23 as shown in FIG. 5.

The structure of controllable isolator 70 discussed above can have a variety of designs to accomplish the same task. FIG. 10(a) shows schematically the cross section (A—A in FIG. 9) of the controllable isolator utilizing a magnetorheological fluid shown in FIG. 9. As shown in FIG. 10(a), the upper and lower flanges 64 and 62 of piston 65 and the upper and lower flanges 74 and 75 of body 63 of controllable isolator 70 form an upper valve 55 and a lower valve 77, respectively. Valves 55 and 77 reduce the volume of magnetorheological fluid to be magnetized thus reducing the amount of power needed for its operation. Additionally reducing the volume increases the rate of shear in the magnetorheological fluid, further improving the efficiency of controllable isolator 70. A concave surface 78 of piston 65 and a convex surface 79 of body 63 of controllable isolator 70 form matching surfaces for aligning piston 65 with respect to body 63 of controllable isolator 70.

Piston 65 and body 63 of controllable isolator 70 as described in embodiments shown in FIGS. 6 through 10(a) preferably have a circular cross section as shown in FIG. 10(b). However, other shapes, such as rectangular, square, or hexagonal, can also be used.

For clarity purposes, all the embodiments described above discussed machines with only one movable component. However, the embodiments discussed above can also be applied to machines with multiple movable components.

Figure 11:
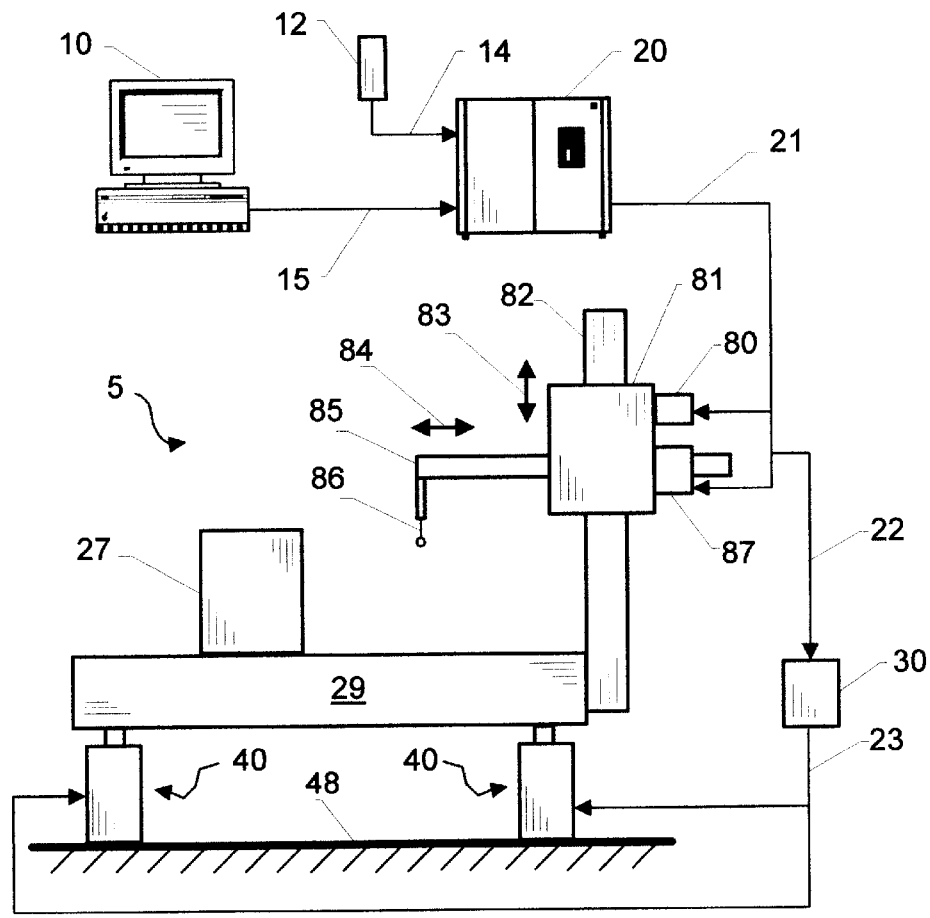
FIG. 11 show schematic vertical elevation of a coordinate measuring machine supported by a vibration isolation system having controllable stiffness and/or damping characteristics.

FIG. 11 shows schematically a vertical elevation of a coordinate measuring machine. A coordinate measuring machine is designed to measure the physical dimensions of a part by use of a probe. One type of coordinate measuring machines uses three mutually orthogonal movable components to move the probe along an arbitrary direction for measuring the dimensions of a part. A probe 86 is moved horizontally with respect to a carriage 81 along direction 84 by means of an arm 85, and vertically with respect to a column 82 along direction 83 by means of carriage 81, respectively. Column 82 can either be fixed with respect to a machine base 29 or can be movable with respect to machine base 29 along a direction perpendicular to directions 83 and 84. Each of the movable components of machine 5 is driven by its corresponding motor, i.e. motor 80 for carriage 81 and motor 87 for arm 85, respectively, via corresponding drive mechanisms (not shown). The motion of each movable component is activated when its corresponding motor receives a separate control signal 21 from a motion controller 20, which receives either a digital motion signal 15 from a digital computer 10 or an analog motion signal 14 from a manual controller 12. For clarity purpose, the two control signals 21 are represented by one line in FIG. 11. Generally speaking, all three movable components must move simultaneously in order for probe 86 to move along a line in an arbitrary direction. The measurement of a point on the part is accomplished during one operation cycle which involves the following three steps: (1) positioning probe 86 with respect to part 27, 2) probing part 27, and 3) retrieving probe 86 from part 27. The velocity profile for each movable component corresponding to steps one and two of the operation cycle is the same as that shown in FIG. 2(a). The second step of the operation cycle is characterized by a nominally constant speed of the movable components and requires maximum vibration isolation efficiency, i.e. less stiffness and/or damping from isolator assemblies 40. The first and the third steps, however, are characterized by large magnitudes of acceleration of deceleration of the movable components, which tend to cause the machine to deviate from and to oscillate about its equilibrium position, resulting in degraded measuring results during the second step of the operation cycle. Therefore more stiffness and/or damping from isolator assemblies 40 is required during the first and the third steps of the operation cycle.

All the isolator assemblies described in embodiments shown in FIGS. 3 through 10 can obviously be applied to machines with multiple movable components and therefore shall be omitted in describing the embodiment shown in FIG. 11. Only the method for generating activation signal 23 for a machine with two or more movable components shall be discussed in detail in the following.

Figure 12:
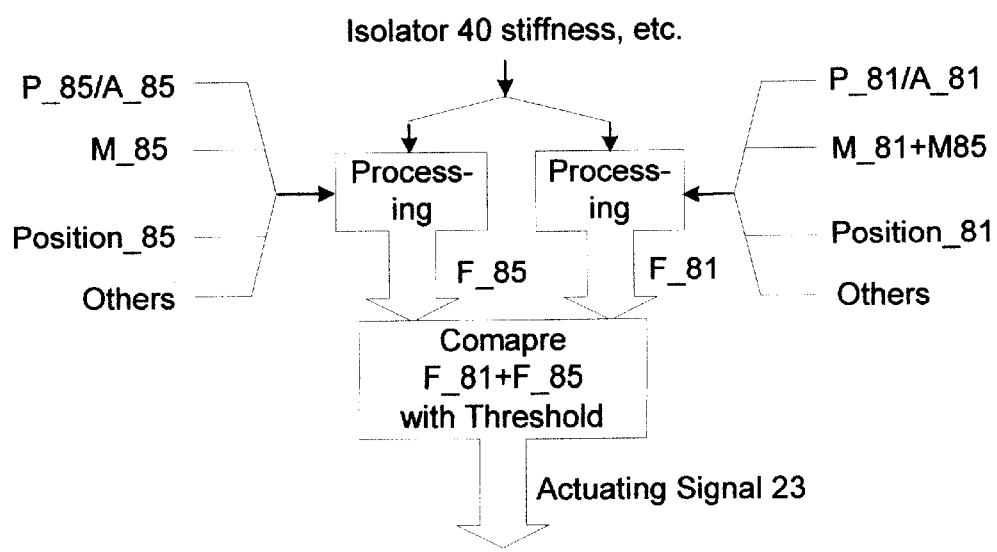
FIG. 12 shows a simplified flow chart for generating an activation signal for machines having two movable components.

FIG. 12 shows a simplified procedure for generating activation signal 23 for machines with two movable components. Motion controller 20 sends control signals 21 to each motor corresponding to each movable component. Control signals 21 are connected to isolation determiner 30 via electrical wires 22. Although parameters such as acceleration magnitudes $A\_81$ and $A\_85$ for the carriage and the arm, respectively, can be used to generate activation signal 23, certain characteristic of control signal 21 is more preferable. In this embodiment the pulse width of a PWM type control signal is used although other characteristic of different type of control signals can also be used. In addition to being easier to implement, the pulse width can also be related to the magnitudes of acceleration or deceleration of the movable components. In this embodiment, isolation determiner 30 extracts a pulse width $W\_81$ from the control signal which is fed to motor 80 responsible for the motion of carriage 81, and $W\_85$ from the control signal which is fed to motor 87 responsible for the motion of arm 85, respectively. The dynamic force $F\_85$, which acts on isolator assemblies 40 as a result of the acceleration of arm 85, can be calculated according to information such as $W\_81$, $W\_85$, the mass of arm 85 ($M\_85$), the position of arm 85 ($L\_85$), and the stiffness of isolator assembly 40. The methodology for performing such a calculation is well known in the art of dynamics and can be found, for example, in "Shock & Vibration Handbook", 3rd Edition, published by McGRAW-HILL in 1987. The dynamic force acting on isolator assemblies 40, i.e. $F\_85$, due to the acceleration of carriage 81, can also be calculated in a similar manner. The combination of these two forces can be related to the potential maximum deviation of machine base 29 from its equilibrium position and therefore can be used for determining activation signal 23. Using a similar principle, the activation signal can be generated for machines with more than two movable components.

The above synthesizing method for generating the activation signal can be simplified as follows: each control signal 21 for the motor of each movable component is weighted according to its corresponding moving mass using simple electric circuits. The combination of all weighted control signals is then used for generating activation signal 23 using methods as described in the above embodiments.

It should be noted that for all the above embodiments, the transition of activation signal 23 from one level to another can be a function of time, for example a linear function, instead of a step function as shown in FIG. 2(e). For example, starting at the end of phase A activation signal 23 can linearly decrease from level $S\_A$ to level $S\_B$ in a time period of $d\_1$. Activation signal 23 does not need to remain constant during any phase of an operation cycle. For example, activation signal 23 can increase linearly during phase A, causing the stiffness and damping of a controllable isolator to increase over time. Thresholds such as $W\_1$ for pulse width, $F\_1$ for force, and $A\_1$ for acceleration can also be adjusted for each phase of an operation cycle based on factors such as the direction of acceleration of the movable component.

It should also be noted that the expression "control signal" used in discussing all the above embodiments is intended to be broad enough to cover any signal generated by the motion controller for controlling the motion of one or more movable components of a machine.

While there has been shown and described what is at present considered the preferred embodiments of the present invention, it will be obvious to those skilled in the art that various changes and modifications may be made therein without departing from the scope of the invention as defined by the appended claims.

I claim:

1. A method for varying the stiffness and/or damping characteristics of a vibration isolation system to reduce the vibration of a machine which has a motion controller means responsible for controlling the motion of at least one movable component of said machine, said method including the steps of:

deriving at least one control signal generated by said motion controller means;

processing the derived at least one control signal to generate at least one activation signal; and varying said stiffness and/or damping characteristics of said vibration isolation system in response to said at least one activation signal.

2. The method of claim 1, wherein said stiffness and/or damping characteristics of said vibration isolation system are varied by controlling the flow characteristics of a fluid disposed in said vibration isolation system for providing a controllable resistance to relative motion between said support means and said machine.

3. The method of claim 1, wherein said stiffness and/or damping characteristics of said vibration isolation system are varied by changing the cross section of at least one gas passage means between at least two gas chamber.

4. The method of claim 1 further including the step for returning said machine to a predetermined position in response to a deviation of said machine from said predetermined position.

5. The method of claim 1, wherein said at least one control signal is indicative of the level of electrical power received by a motor means for driving said at least one movable component.

6. The method of claim 5 further including the step of ensuring that said stiffness and/or damping characteristics of said vibration isolation system are enhanced before said motor means experiences an increase in electrical power.

7. The method of claim 6 further including the step of ensuring that said stiffness and/or damping characteristics of said vibration isolation system are reduced after said motor means experiences a decrease in electrical power.

8. A vibration isolation system for reducing the vibration transmissibility between a support means and a machine which has a motion controller means responsible for controlling the motion of at least one movable component of said machine, said vibration isolation system comprising:

one or more isolator assembly means adapted to be disposed between said support means and said machine, said isolator assembly means having controllable stiffness and/or damping characteristics;

means for deriving at least one control signal generated by said motion controller means;

logic means for extracting one or more characteristics from the derived at least one control signal to generate at least one activation signal when the extracted one or more characteristics satisfy one or more pre-determined criteria; and control means for varying said controllable stiffness and/or damping characteristics of said isolator assembly means in response to said at least one activation signal.

9. The isolator assembly means of claim 8 further including regulator means for returning said machine to a predetermined position in response to a deviation of said machine from said predetermined position.

10. The vibration isolation system of claim 6 wherein said controllable stiffness and/or damping characteristics are varied when one or more characteristics of said at least one control signal satisfy one or more pre-determined criteria.

11. The vibration isolation system of claim 8 wherein said control signal is of the PWM type and said controllable stiffness and/or damping characteristics are increased when the pulse width of the PWM type control signal exceeds a threshold.

12. The vibration isolation system as set forth in claim 8, wherein said stiffness and/or damping characteristics of said isolator means are varied by controlling the flow characteristics of a fluid disposed in said vibration isolation system for resisting relative motion between said support means and said machine.

13. The isolator assembly means of claim 8 further comprising:

a main chamber, filled with pressurized gas, having a rigid body and a flexible diaphragm, one being connected to said support means and the other to said machine;

at least one auxiliary chamber filled with pressurized gas;

gas passage means for communicating between said main chamber and said at least one auxiliary chamber;

actuator means for controlling the cross section of said gas passage means in response to said activation signal.

14. The isolator assembly means of claim 13 further comprising regulator means for controlling the gas pressure within said main chamber and/or said at least one auxiliary chamber for returning said machine to a predetermined position in response to a deviation of said machine from said predetermined position.

15. The isolator assembly means of claim 13, wherein said machine chamber and said at least one auxiliary chamber are placed horizontally for minimizing the overall height of said isolator assembly means.

16. The isolator assembly means of claim 13, wherein said main chamber further including means for limiting the area of said flexible diaphragm for reducing the load carrying capability of said vibration isolation system.

17. The isolator assembly means of claim 8 further comprising:

a gas chamber, filled with pressurized gas, having a rigid body and a flexible diaphragm, one being connected to said support means and the other to said machine;

a fluid, whose viscosity is varied in response to said activation signal, for providing a controllable resistance to relative motion between said support means and said machine.

18. The vibration isolation system of claim 8, wherein said at least one control signal is indicative of the level of electrical power received by a motor means for driving said at least one movable component.

19. The vibration isolation system of claim 18 further including means for ensuring that said stiffness and/or damping characteristics of said vibration isolation system are enhanced before said motor means experiences an increase in electrical and are reduced after said motor means experiences a decrease in electrical power.

* * * * *